US012592516B2

(12) United States Patent
Wallensteiner et al.

(10) Patent No.: US 12,592,516 B2
(45) Date of Patent: Mar. 31, 2026

(54) ELECTRICAL PLUG CONNECTOR WITH MULTIPLE LEVER SYSTEMS FOR FACILITATING PLUGGING AND/OR RELEASING AND PLUG CONNECTOR ASSEMBLY THEREFOR

(71) Applicant: Robert Bosch GmbH, Stuttgart (DE)

(72) Inventors: Georg Wallensteiner, Gemmrigheim (DE); Vishwanath Kristappa Badami, Ludwigsburg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 400 days.

(21) Appl. No.: 17/909,306

(22) PCT Filed: Feb. 2, 2021

(86) PCT No.: PCT/EP2021/052395
§ 371 (c)(1),
(2) Date: Sep. 21, 2022

(87) PCT Pub. No.: WO2021/175523
PCT Pub. Date: Sep. 10, 2021

(65) Prior Publication Data

US 2023/0087250 A1 Mar. 23, 2023

(30) Foreign Application Priority Data

Mar. 5, 2020 (DE) ..................... 10 2020 202 822.2

(51) Int. Cl.
*H01R 13/629* (2006.01)
*H01R 13/62* (2006.01)

(52) U.S. Cl.
CPC . *H01R 13/62972* (2013.01); *H01R 13/62966* (2013.01); *H01R 13/62* (2013.01);
(Continued)

(58) Field of Classification Search
CPC ........ H01R 13/62972; H01R 13/62966; H01R 13/62; H01R 13/629; H01R 13/62933;
(Continued)

(56) References Cited

U.S. PATENT DOCUMENTS

| | | | | |
|---|---|---|---|---|
| 6,019,620 | A * | 2/2000 | Kodama .......... | H01R 13/62966 439/372 |
| 6,254,414 | B1 | 7/2001 | Sawayanagi et al. | |
| 10,787,160 | B2 | 9/2020 | Kurz et al. | |

FOREIGN PATENT DOCUMENTS

| | | |
|---|---|---|
| CN | 102957019 A | 3/2013 |
| CN | 108496283 A | 9/2018 |

(Continued)

OTHER PUBLICATIONS

International Search Report for PCT/EP2021/052395, Issued Apr. 6, 2021.

*Primary Examiner* — Justin M Kratt
(74) *Attorney, Agent, or Firm* — NORTON ROSE FULBRIGHT US LLP

(57) ABSTRACT

A plug connector to be plugged along a plug-in direction into a mating plug connector having a mating plug connector housing. The plug connector includes a plug connector housing; electrical contact elements, which are situated in the plug connector housing; a first lever system to reduce an operating force when the plug connector is plugged into and/or released from the mating plug connector, the first lever system being rotatably supported on the plug connector housing, the first lever system having: first and second arms, the second arm being pivotably situated on the first arm using a first joint pin, the first joint pin being movable in the plug connector housing in a first guide slot, which essentially extends along the plug-in direction, a first guide
(Continued)

system between the first arm and the plug connector housing, and a second guide system between the second arm and the plug connector housing.

14 Claims, 14 Drawing Sheets

(52) U.S. Cl.
CPC ...... *H01R 13/629* (2013.01); *H01R 13/62933* (2013.01); *H01R 13/62955* (2013.01); *H01R 13/62977* (2013.01); *H01R 2201/26* (2013.01)

(58) Field of Classification Search
CPC ........ H01R 13/62955; H01R 13/62977; H01R 2201/26
See application file for complete search history.

(56) References Cited

FOREIGN PATENT DOCUMENTS

| | | | |
|---|---|---|---|
| CN | 108779888 | A | 11/2018 |
| DE | 29512869 | U1 | 12/1996 |
| DE | 20019482 | U1 | 3/2002 |
| DE | 102013216829 | A1 | 2/2015 |
| EP | 0933836 | A2 | 8/1999 |
| JP | 06236782 | A | 8/1994 |
| JP | 2000224737 | A | 8/2000 |
| JP | 2007184164 | A | 7/2007 |
| JP | 2018181842 | A | 11/2018 |

* cited by examiner

| A | | B | | V | |
|---|---|---|---|---|---|
| A40 = | 76,8 | B40 = | 11,8 | A40 / B40 = | 6,5 |
| A30 = | 73,7 | B30 = | 8,7 | A30 / B30 = | 8,5 |
| A20 = | 71,8 | B20 = | 6,8 | A20 / B20 = | 10,6 |
| A10 = | 70,8 | B10 = | 5,8 | A10 / B10 = | 12,2 |
| A0 = | 70,5 | B0 = | 5,5 | A0 / B0 = | 12,8 |
| A-10 = | 70,8 | B-10 = | 5,8 | A-10 / B-10 = | 12,2 |

ELECTRICAL PLUG CONNECTOR WITH MULTIPLE LEVER SYSTEMS FOR FACILITATING PLUGGING AND/OR RELEASING AND PLUG CONNECTOR ASSEMBLY THEREFOR

FIELD

The present invention relates to a plug connector to be plugged into a mating plug connector along a plug-in direction, e.g., a plug connector which is mounted on a cable tree and can be plugged into a mating plug connector of a control unit of a vehicle. The present invention also relates to a plug connector assembly.

BACKGROUND INFORMATION

Plug connectors and mating plug connectors in different embodiments are described in the related art. Because of the increasing number of contact elements provided in a plug connector, such plug connectors and mating plug connectors are steadily increasing in size, and ever greater (plug-in) forces must be applied to establish and release the plug connection. For instance, a multitude of contact elements which are crimped to a line of a cable tree are provided in the plug connector. The contact elements may be socket elements (female contact elements), for example. When the plug connector is plugged into the mating plug connector, mating contact elements of the mating plug connector in the form of pins or contact blades (male mating contact elements), for example, can be plugged into the contact elements. It is of course understood that there are also plug connectors which have male contact elements and mating plug connectors that have female counter-contact elements.

In this context, a maximum plug-in force is often given at a defined plug position. For instance, this may be the plug position at which what is known as a feed-in peak must be overcome. At this position, for example, contact lamellae are displaced transversely to the plug-in direction by the penetrating pins or contact blades. The feed-in peaks of all contact elements may add up and cause a very high plug-in force.

To avoid that an installer will be faced with an excessively high operating force when plugging the plug connector into the mating plug connector, plug connectors are available which are provided with lever systems and/or slider systems for reducing the operating forces, for instance. An operating force of maximally 75 N, for example, should not be exceeded.

European Patent Application No. EP 0 933 836 A2 describes a plug connector for which the operating forces during the connection to a corresponding mating plug connector are meant to be reduced by a combination of a lever and a slider which can be operated by the lever. However, this construction requires relatively much space transversely to the plug-in direction since the slider is shifted transversely to the plug-in direction during the plug-in operation. In addition, the design of the plug connector with the lever and slider is relatively complex.

SUMMARY

It is an object of the present invention to provide a plug connector and a plug connector assembly including a plug connector and a mating plug connector which enables a secure plug-in and release of the plug connection by a simple and cost-effective design and requires a lower operating force in comparison with the plug-in force. In addition, the plug connector should be connectable to a mating plug connector using the shortest possible operating travel in order to reduce the work of the installer on the one hand and to require a minimum of design space or operating space on the other hand.

The object may be achieved by a plug connector having the features of present invention and by a plug connector assembly having the features of the present invention.

Preferred refinements and embodiments of the present invention are disclosed herein.

A plug connector according to an example embodiment of the present invention may offer an advantage of enabling a simple and secure connection of a plug connector to a mating plug connector of a plug connector assembly. During the plug-in operation along plug-in direction Z, the electrical contacts or contact elements of the plug connector and the counter contacts or counter-contact elements of the mating plug connector are brought into contact with one another. The required (operating) forces for establishing and releasing the plug connection (of the plug connector and mating plug connector plugged together) are able to be kept below a threshold of 75 N, for instance, or even below a threshold of 50 N or even below a threshold of 40 N, for instance, the number of electrical contacts in particular being greater than 20. In addition, this operating force reduction may advantageously be accompanied by a short operating travel.

According to an example embodiment of the present invention, a lever device or lever system is provided on the plug connector, which allows for an efficient force transmission during the plug-in operation, in particular an especially high reduction of the operating force during the individual plug-in travels in which especially high plug-in forces occur. In other words, the lever device or lever system is designed to reduce an operating force during the plug-in operation, especially in a non-linear fashion or in particular by a force translation that is variable across the operating travel.

According to an example embodiment of the present invention, the plug connector includes a first lever system to reduce an operating force when the plug connector is plugged into and/or released from the mating plug connector. The first lever system is rotatably mounted on a plug connector housing of the plug connector. The mating plug connector has a mating plug connector housing. The plug connector and mating plug connector, in particular their housing parts, are able to be mechanically connected to each other when the plugs are plugged together. The first lever system includes a first and a second arm, the second arm being pivotably disposed on the first arm with the aid of a first joint pin. The first joint pin is movable or displaceable in the plug connector housing in a first guide slot, which essentially extends along plug-in direction Z. In addition, a first guide system is provided between the first arm and the plug connector housing, the first guide system having a first guide element and a first guide receptacle to accommodate the first guide element. The second guide system is provided between the second arm and the plug connector housing. The second guide system includes a second guide element and a second guide receptacle to accommodate the second guide element. A first and a second engagement element are provided in addition. The first engagement element is situated on the first arm and designed to engage with a first counter element on the mating plug connector housing. The second engagement element is situated on the second arm and designed to engage with a second counter element on the mating plug connector housing. The first and the second engagement elements are preferably disposed on a free end of the first and second arm. In this way, the first and second engagement elements come into immediate contact with the counter elements on the mating plug connector housing when the plug connector housing is placed on the mating plug connector housing.

The method of functioning of the plug connector or lever system is as follows. When the lever system is rotated (e.g., about an axis extending transversely to the plug-in direction, e.g., through two oppositely disposed longitudinal sides of the plug connector housing), the first arm is displaced along a direction specified by the first guide system (e.g., transversely to the plug-in direction and transversely to the axis toward the outside) because of the first guide system that is situated on the first arm. The first joint pin may be used as a rotation point or as a type of pivoting shaft for the rotary motion. To allow for the displacement of the bend-resistant first arm according to the direction specified by the first guide system, the first joint pin simultaneously moves or shifts in the first guide slot (e.g., from above to below, i.e., along the plug-in direction).

In the same way, the second arm is able to be displaced with the aid of the second guide system during the rotary motion of the first lever system along a desired direction, e.g., transversely to the plug-in direction and transversely to the axis in an outward direction, but in the opposite direction to the first arm, for example).

In other words, the first guide system establishes a desired relative movement in a desired or preferred direction between the first arm and the plug connector or the plug connector housing. The second guide system establishes a desired relative movement in a desired or preferred direction between the second arm and the plug connector or the plug connector housing.

If the first engagement element then engages with the first counter element when the plug connector and the mating plug connector are plugged together or vice versa (the same applies to the second engagement element and the second counter element, which is not further described in the following text), then the plug connector and the mating plug connector are pulled toward one another along the plug-in direction on account of the afore-described combined displacement, and the plug connection is closed.

Because of the combination of the movement of the first joint pin in the first guide slot and the first arm in the first guide system (and thus also of the first engagement element), the distance between an operating end of the lever and the first counter element and simultaneously a further distance between the first joint pin and the first counter element changes during the rotation of the lever system. The mutual relationship between these two distances results in a mechanical advantage of the lever system, and thus the factor of the operating force reduction. This mechanical advantage may be variable, for example, as a function of the operating travel of the lever system or as a function of the angle of rotation of the lever system.

With the aid of the development (or disposition) of the first guide system (and the second guide system) relative to the first guide slot, the mechanical advantage is able to be varied during the rotary motion, which means that an efficient operation is advantageously induced during the plug-in operation by a very simple design. This is because the mechanical advantage may be low at operating travels between the plug connector and the mating plug connector in which only low plug-in forces occur, so that a small rotary motion achieves a large plug-in travel. In plug sections that induce a high plug-in force, the mechanical advantage may be greater so that a greater angle of rotation may be necessary for the same travel along the plug-in direction, but there is also a greater reduction in the operating force because of the higher translation in these travel sections.

In an advantageous manner, the system according to the present invention thus allows for a reduction of the required operating forces in the plug-in operation by a very simple, robust, and compact design. A separate slider element driven by the lever system and/or a gear wheel structure or toothed rack structure may advantageously be dispensed with. It is furthermore advantageous that the operating travel required for the plug connection is able to be reduced at the same time.

In addition, the first and the second guide system and also the first guide slot advantageously prevent tilting (relative to one another) and/or jamming of the plug connector and the mating plug connector when plugged together.

In the context of this application, the term 'having' is basically synonymous with the expression 'include'.

In a Cartesian coordinate system, for example, the plug-in direction may be denoted as the Z-direction or as the vertical direction. A direction of the axis of rotation of the first lever system may be denoted as the Y-direction. A direction that is perpendicular both to the Y-axis and the Z-axis may be denoted as the X-direction (e.g., a direction along which a longitudinal side of the plug connector housing extends, for instance).

A direction of rotation of the first lever system in which the plug connector and the mating plug connector are able to be plugged together may then be referred to as the C-direction.

A direction that points from the outside toward the inside of the plug connector housing—transversely to the plug-in direction—may be described as pointing radially inward, and the reverse direction (from the inside to the outside) as pointing radially outward.

The expression according to which a guide system is provided between an arm and the plug connector housing is meant to describe that the arm and plug connector housing interact with each other with the aid of the guide system.

The respective engagement elements, simply by way of example, may be embodied as a slot or a groove, and the corresponding counter elements as a pin or bolt. As a matter of principle, the engagement element can also be embodied as a pin or bolt, etc., and the counter element as a groove or slot, recess, etc.

The expression 'essentially along the plug-in direction' may be understood as directions that extend by up to +/−30° with respect to the plug-in direction.

For instance, it may be provided that the first guide slot is situated between the first guide system and the second guide system. This may be the case viewed along the X-axis, for example. In this way, self-centering of the plug connector relative to the mating plug connector may advantageously take place when the plug-in connection is established or released. This advantageously reduces the tilting or jamming risk and thus the risk of increasing the plug-in forces and/or of an occurrence of transverse forces on the contact elements. For instance, it may be provided that the first guide system has a development that is identical to or a mirror image of the second guide system in terms of its geometrical dimensions. This further facilitates the self-centering.

Moreover, according to an example embodiment of the present invention, the plug connector preferably includes a second lever system. The second lever system preferably has the same development as the first lever system. The second lever system includes a third and a fourth arm, the fourth arm being disposed on the third arm with the aid of a second joint pin. The second joint pin is movably situated in the plug connector housing in a second guide slot, which essentially extends along the plug-in direction. The first and second guide slots are preferably disposed in parallel with each other. In addition, the second lever system includes a third guide system between the third arm and the plug connector housing, the third guide system including a third guide element and a third guide receptacle to accommodate the third guide element. A fourth guide system is provided on the second lever system between the fourth arm and the plug connector housing, the fourth guide system having a fourth guide element and a fourth guide receptacle to accommodate the fourth guide element. Moreover, a third engagement element and a fourth engagement element are provided. The third engagement element is situated on the third arm and designed to engage with a third counter element on the mating plug connector housing. In addition, the fourth engagement element is situated on the fourth arm and designed to engage with a fourth counter element on the mating plug connector housing.

For example, it may be provided that the second guide slot is placed between the third guide system and the fourth guide system. This may be the case viewed along the X-axis, for example. In this way, self-centering of the plug connector relative to the mating plug connector may take place when the plug connection is established or released. This advantageously reduces the risk of tilting or jamming and thus of an increase in the plug-in forces and/or an occurrence of transverse forces on the contact elements. For example, it may be provided that the third guide system has a development that is identical to or a mirror image of the fourth guide system in terms of its geometrical dimensions. This further facilitates self-centering. For instance, it may be provided that all four guide systems have an identical or mirror-image development to one another in terms of their geometrical dimensions.

In a particularly preferred manner, according to an example embodiment of the present invention, the first and second lever systems are disposed on sides of the plug connector housing situated opposite each other. This advantageously makes it possible to apply a uniform force introduction via the first and second lever system during the plug-in process and the release of the plug connection. In addition, this advantageously makes it possible to reduce the risk of tilting when the plug connector and the mating plug connector are plugged together. Finally, in an advantageous manner, the first lever system and the second lever system can thus be developed in a more compact manner and with less material since the operating force is distributed to both lever systems.

According to an example embodiment of the present invention, in an especially preferred manner, each guide system has a pin as a guide element and a groove as a guide receptacle, and a position of each pin in its individual groove is variable. This advantageously results in a particularly simple and robust embodiment of the guide system.

Because of the form specification of the groove, the mechanical advantage is also able to be developed during the rotary movement of the lever. Thus, this embodiment of the guide system (groove, pin) makes it possible to provide a guide system that is particularly easy to realize and consequently a lever system that is adaptable to different requirements (an operating force reduction/operating travel reduction). An especially compact design is possible if a pin is disposed on one of the arms of the lever systems and a groove in the plug connector housing in each case. It should be noted that the placement of the pins and grooves may also be reversed so that the grooves are provided in the arms and the pins on the plug connector housing. Instead of grooves, it is also possible to provide guide surfaces as guide receptacles along which a guide element is moved such as a pin or a lug or a rail, a ball of a ball bearing, etc. Such a guide receptacle may have a guide surface, e.g., a guard-rail-type restriction. The guide system or the guide receptacle may also be a link structure, for instance. In addition, a groove may be disposed on an arm and a pin on another arm.

The grooves of the guide systems extend essentially (+/−30°) transversely to plug-in direction Z, that is, essentially along the X-direction, for example, especially at a right angle. Plug-in direction Z is preferably the vertical direction, and the grooves especially preferably extend perpendicular to the vertical direction in the horizontal direction (e.g., the X-direction).

This makes it possible to realize an especially simple development of the guide systems.

However, it should be noted that the grooves may also extend at an angle smaller than 90° to the plug-in direction.

The grooves may also be provided in the form of an arc featuring a constant radius, in particular.

To allow for especially simple handling, the first and second lever systems are connected to each other with the aid of a connection element. This essentially results in a U-shaped lever whose two arms form the first and the second lever system.

In an advantageous manner, this also reduces the risk of tilting and/or jamming when the plugs are plugged together.

In addition, the first and second guide slot preferably have a rectilinear development. This advantageously allows for a particularly simple design of the plug connector.

In a further refinement of the present invention, it is provided that the first and second guide slots are disposed in a vertical direction. This advantageously allows for an especially simple design of the plug connector. Moreover, this also enables a particularly low-friction operation.

In addition, according to an example embodiment of the present invention, the first joint pin is preferably situated on the first arm. This allows for a particularly robust development of the first arm.

The second arm may then have an opening whose shape corresponds to the shape of the first joint pin so that pivoting about the first joint pin is possible.

As an alternative or in addition, the second joint pin is positioned on the third arm. This advantageously allows for a particularly robust development of the third arm.

Moreover, the fourth arm advantageously has an opening which is shaped in accordance with the second joint pin so that pivoting about the second joint pin is possible.

In addition to the different geometrical developments of the grooves of the guide system, for instance as rectilinear or arched grooves, it is preferably also possible to provide the grooves in a common horizontal plane or to provide them at different horizontal positions.

When viewed along plug-in direction Z, the guide slots on the plug connector housing are preferably disposed in such a way that the guide slots have a lower end which lies below the grooves of the guide systems. In addition, the guide slots, viewed along the plug-in direction, preferably have an upper end, which lies above the grooves. The upper end is preferably developed with a larger cross-section than the rest of the guide slots. Moreover, it is possible that laterally stepped guide surfaces are provided on the grooves on the groove walls and that the pins have a circumferential groove in each case so that a pin end is developed as a head and the circumferential groove forms a neck-type slot, and the head of the pin is thereby guidable at the guide surfaces. This makes it impossible for the pins to unintentionally disengage from the guide slots.

In addition, the present invention relates to a plug connector assembly having a plug connector according to the present invention and a mating plug connector, the mating plug connector having a mating plug connector housing and counter elements such as pins on the mating plug connector housing, which are set up to engage with the engagement elements of the plug connector.

In a preferred manner, according to an example embodiment of the present invention, the plug connector assembly has on the mating plug connector a plurality of electrical counter-contact elements, which are situated in the mating plug connector housing and are designed to contact the electrical contact elements of the plug connector for an electrical connection in the plugged-in state of the plug connector and the mating plug connector. The counter-contact elements, for example, are developed as pins or contact blades (male counter-contact elements). It is understood that the counter-contact elements may also be developed as female counter-contact elements, preferably including contact blades or contact lamellae into which the contact elements in the form of pins or similar shapes of the plug connector will then be plugged.

Moreover, in the plug connector assembly the counter elements on the mating plug connector housing are preferably coupled with complementary counter-element structures on the plug connector housing when plugged together, and the counter elements shift relative to the plug connector housing along the plug-in direction during the plug-in operation.

This advantageously reduces the risk of tilting when the plug connector and mating plug connector are joined.

The counter elements may be developed as pins or projections on the mating plug connector housing, for instance. The counter-element structures may then be developed in the form of grooves or slots, for example.

The plug connector assembly is preferably used in the automotive sector in control units. More specifically, the plug connector assembly according to the present invention is very advantageous especially when a cable tree is plugged in that has a multitude of electrical contacts, in particular more than 20 contacts, furthermore preferably more than 50 contacts, and more preferably more than 100 contacts, so that an establishment and release of the plug connection is possible at a force expenditure of less than 75 N.

BRIEF DESCRIPTION OF THE DRAWINGS

In the following text, preferred example embodiments of the present invention are described in detail with reference to the figures.

DETAILED DESCRIPTION OF EXAMPLE EMBODIMENTS

In the following text, a plug connector assembly 100 having a plug connector 1 and a mating plug connector 20 will be described in detail with reference to FIGS. 1 to 16.

For example, plug connector assembly 100 is able to be used in the automotive sector. Plug connector 1 may be a plug connector at the end of a cable tree of a motor vehicle, for instance. Mating plug connector 20 may then be disposed on a control unit, for example.

Figure 1:
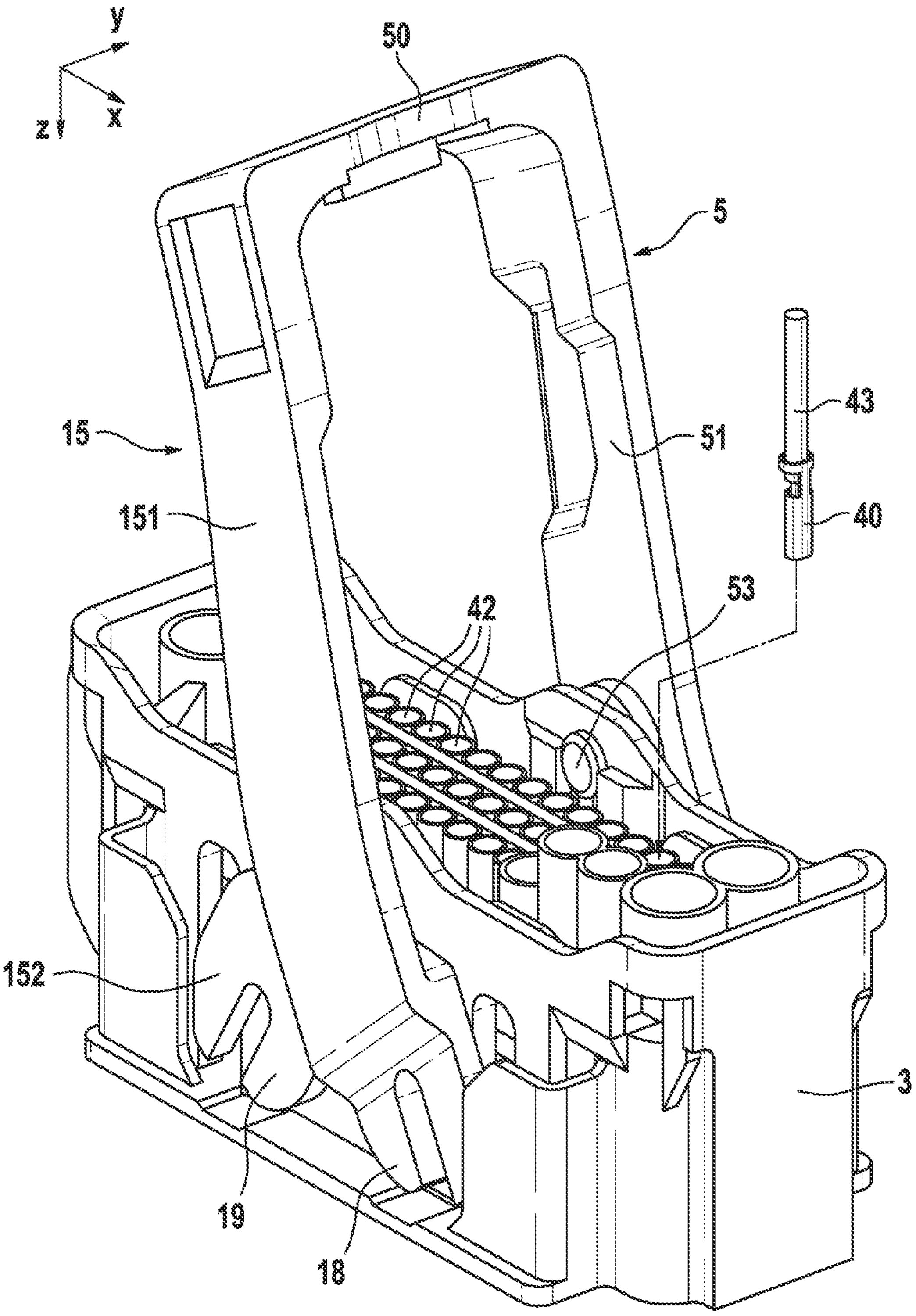
FIG. 1 shows a schematic, perspective view of the plug connector without a cover, according to an example embodiment of the present invention.
Figure 2:
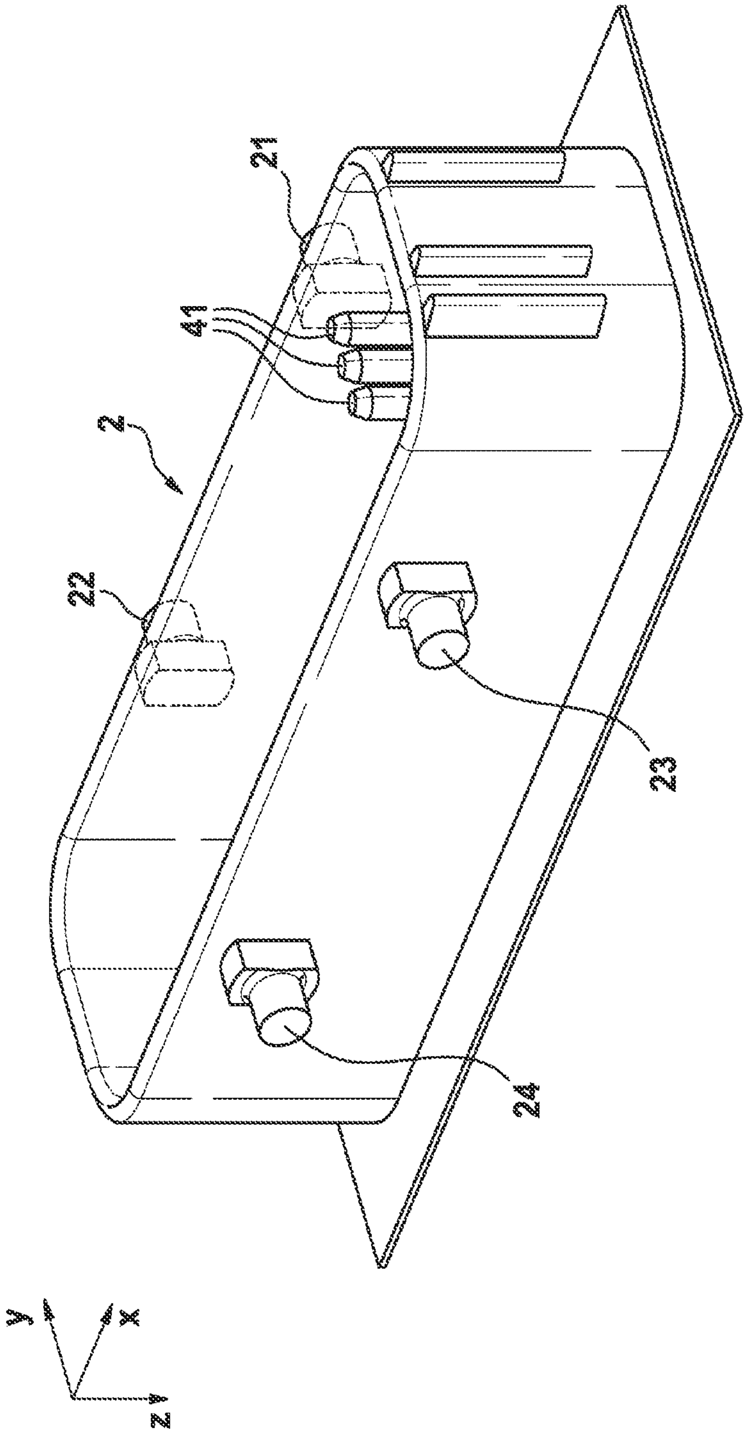
FIG. 2 shows a schematic, perspective view of the mating plug connector, according to an example embodiment of the present invention.
Figure 5:
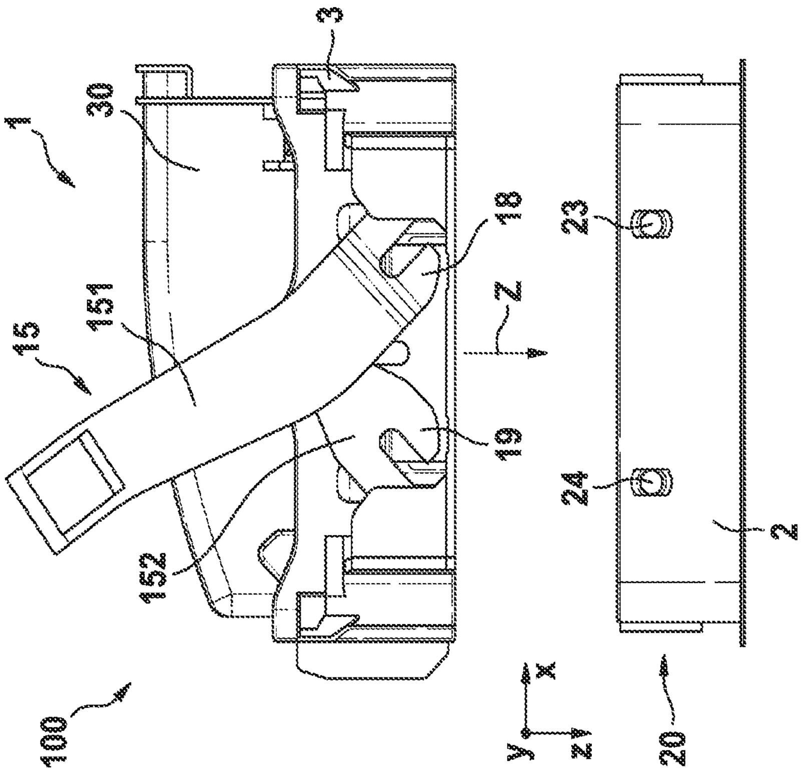
FIG. 5 shows a schematic side view of a plug connector assembly in an unconnected state, according to an example embodiment of the present invention.

As may be gathered from FIGS. 1 and 2, electric plug connector assembly 100 includes a plug connector 1 (FIG. 1) as well as a mating plug connector 20 (FIG. 2). Plug connector 1 and mating plug connector 20 have a mutually complementary development and are designed to be plugged together along a plug-in direction Z (FIG. 5).

Plug connector 1 has a plug connector housing 3 that accommodates a plurality of electrical contact elements 40. In this instance, the contact elements are disposed in contact chambers 42 in the interior of plug connector housing 3, for example. A lead 43 may be attached to contact elements 40, e.g., by a crimped connection. Leads 43 jointly form a cable tree, which is not shown here, at whose end plug connector 1 is situated. The cable tree can be routed away from plug connector 1 on the side with the aid of a cover 30, which is shown in FIG. 5, for instance.

Mating plug connector 20 has a mating plug connector housing 2. A plurality of counter-contact elements 41 is situated in mating plug connector housing 2. They may be developed in the form of contact blades or pins, for example. In this exemplary embodiment, four counter elements 21, 22, 23, 24 are situated on an outer side of mating plug connector housing 2, two at each longitudinal side of mating plug connector housing 2.

Plug connector 1 is placed on mating plug connector 20 (FIG. 6) along a plug-in direction Z (see FIG. 5) and then plugged farther into mating plug connector 20 with the aid of a lever device or lever system, the electrical contacting between electrical contact elements 40 and electrical counter-contact elements 41 being established in the process.

Plug-in direction Z is vertical in this exemplary embodiment, and plug connector 1 is moved exclusively in the vertical direction relative to mating plug connector 20 during the entire plug-in operation. In this way, no transverse forces, e.g., on electrical contact elements 40 and electrical counter-contact elements 41, are exerted during the plug-in operation. Moreover, in contrast to a solution in which the force translation is induced by a slider element which is displaceable along the X-axis, for example, the operating force is further reduced. This is because in a solution that uses a slider element, the transverse forces (along the X-direction) also induce greater frictional forces during the plug-in operation in plug-in direction Z. The same also applies to the release operation (unplugging) of the plug connector assembly.

In this instance, plug connector 1 furthermore includes a first lever system 5 and a second lever system 15, which are rotatably mounted on plug connector housing 3, in order to reduce an operating force when the plug connector and the mating plug connector are plugged together and/or disconnected. As a matter of principle, it is also possible to provide only one (first) lever system. First and second lever system 5, 15 are connected to each other with the aid of a connection element 50 in the form of a bridge at one of the ends of the levers (see FIG. 6). First and second lever system 5, 15 are situated on the sides of plug connector housing 3 in each case so that a uniform lever force introduction is possible when the plug connection is established and/or released.

In this exemplary embodiment, first lever system 5 and second lever system 15 have the same technical development. As may be gathered in particular from FIGS. 3 and 4, first lever system 5 includes a first arm 51 and a second arm 52. Second arm 52 is shorter than first arm 51 by way of example. In this exemplary embodiment, second arm 52 is pivotably situated on first arm 51 with the aid of a first joint pin 53. It is understood that first joint pin may also be situated on second arm 52 and situated or fixed in place in an opening of first arm 51, for instance. It is also possible to provide first joint pin 53 as a separate element, for example, which is inserted through openings in first arm 51 and in second arm 52 or fixed in place there.

Second lever system 15 includes a third arm 151 and a fourth arm 152. Here, fourth arm 152 is shorter than third arm 151 by way of example. Fourth arm 152 is pivotably situated on third arm 151 with the aid of a second joint pin 153.

Figure 4:
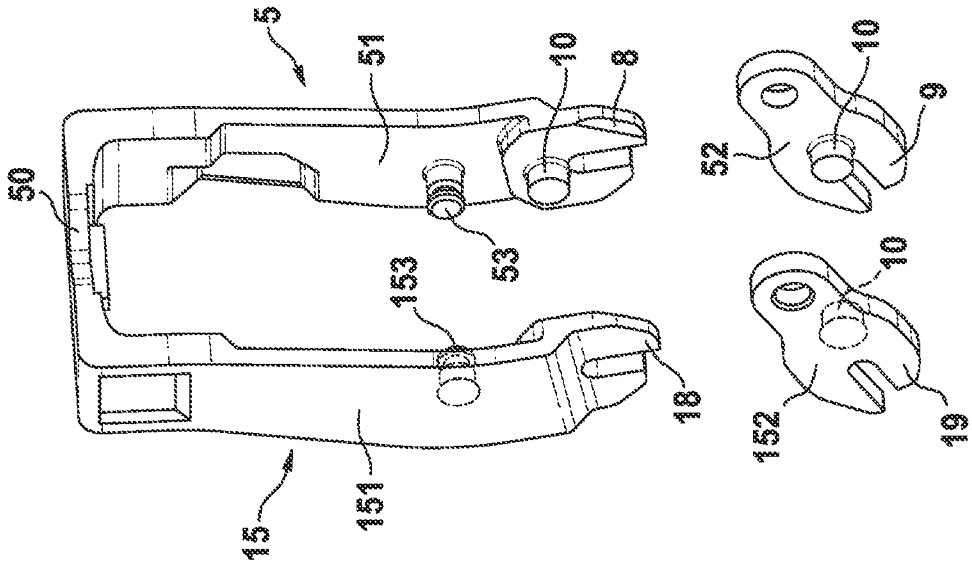
FIGS. 3 and 4 show perspective, schematic views of lever systems of the plug connector of FIG. 1.
Figure 3:
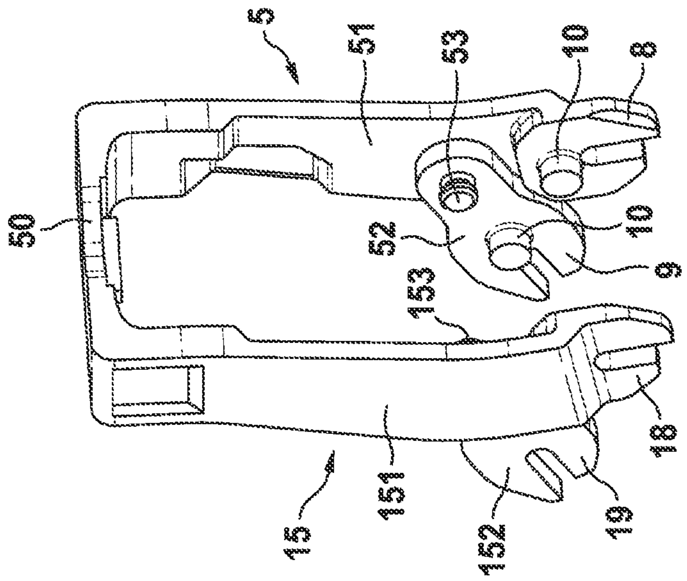
Figure 6:
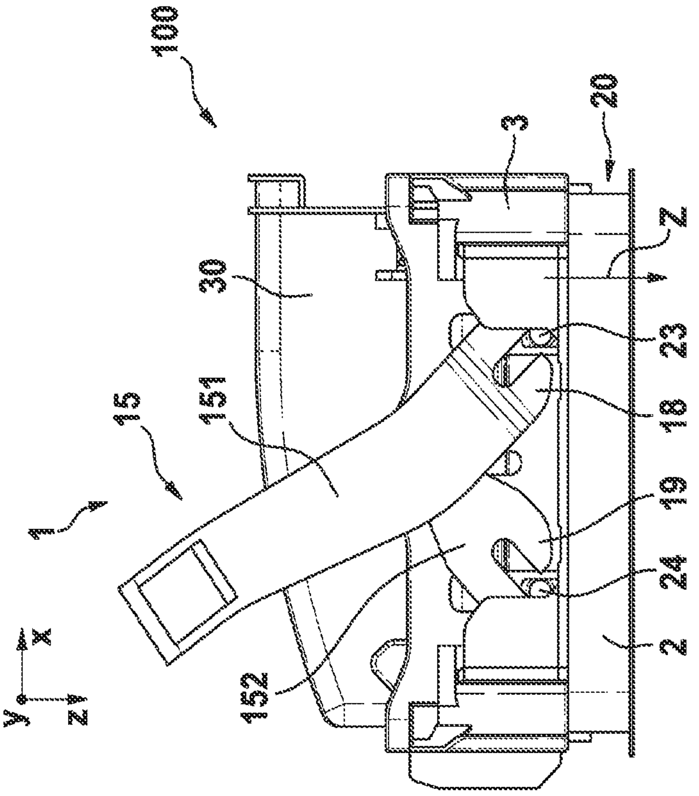
FIG. 6 shows a schematic side view of the plug connector assembly of FIG. 5 in which the plug connector has been placed on the mating plug connector without the plug-in operation having commenced yet.

As may furthermore be gathered from FIGS. 3 and 4, each lever system 5, 15 has engagement elements 8, 9, 18, 19. More specifically, a first engagement element 8 is situated on the free end of first arm 51, and a second engagement element 9 is situated on second arm 52. A third engagement element 18 is situated on third arm 151 and a fourth engagement element 19 is situated on fourth arm 152. In this exemplary embodiment, the four engagement elements 8, 9, 18, 19 are developed as grippers having fixed collet jaws, and a slot or a groove or a recess is provided between the collet jaws. These engagement elements 8, 9, 18, 19 then engage via the slot with counter elements 21, 22, 23, 24 developed on mating plug connector housing 2 (see FIG. 2). Mating plug connector 20 has a first counter element 21 and a second counter element 22 on a first side surface. On a second side situated opposite the first side, mating plug connector 20 has a third counter element 23 and a fourth counter element 24. In this exemplary embodiment, the counter elements have the same design simply by way of example. They are developed in the form of cylindrical pins in this instance, i.e., in the form of circular cylindrical pins. Other basic forms are also possible, e.g., rectangular, elliptical, etc. basic forms. The pins, by way of example, have been placed on a base which has an approximately rectangular cross-section (cuboid shape). A longitudinal axis of the base is aligned along plug-in direction Z. Here, for example, the base is rounded at its upper and lower end. The base may have two functions. For one, it stabilizes the pin of counter element 21, 22, 23, 24 because these pins now no longer project as far from plug connector housing 3 by thin cross-sections. For another, the base may bring about better guidance in the counter-element structures.

FIGS. 7 to 10 illustrate the further development of plug connector 1 and the interaction with mating plug connector 20, FIGS. 7 to 10 showing vertical sectional planes at different depths through the lever system or plug connector housing 3. Above all, second lever system 15 and its elements are shown. The description is transferable to first lever system 5, however.

As may furthermore be gathered from FIGS. 1, 3, 4 and 24, a lever system 5, 15 has a guide system between each arm and plug connector housing 3. More specifically, a first guide system 6 (see FIG. 24) is provided between first arm 51 and plug connector housing 3. A second guide system 7 (see FIG. 24) is provided between second arm 52 and plug connector housing 3. A third guide system 16 (see, for instance, FIGS. 8 and 10) is provided between third arm 151 and plug connector housing 3. A fourth guide system 17 (see, for example, FIGS. 8 and 10) is provided between fourth arm 152 and plug connector housing 3. Third and fourth guide systems 16, 17 are able to be gathered in greater detail from FIGS. 8 and 10.

By way of example, each of the four guide systems 6, 7, 16, 17 has a pin 10, which is guided in a groove 1 which forms a guide receptacle for pin 10. In the first exemplary embodiment, groove 11 is aligned in a horizontal direction (along the X-direction). Pins 10, merely by way of example, have a cylindrical development, e.g., a circular cylindrical development in this instance. In cooperation with the two joint pins 53, 153, the four guide systems ensure the relative movement between lever systems 5, 15 (especially their arms 51, 52, 151, 152) and plug connector housing 3, and thus also the relative movement between plug connector 1 and mating plug connector 20 along plug-in direction Z. As can be gathered from FIG. 8, two grooves 11 are provided in plug connector housing 3 to the left and right of second guide slot 33. In the same way, first guide slot 32 and grooves 11 are also provided in first lever system 5, which is situated on the other side of plug connector housing 3.

Figure 7:
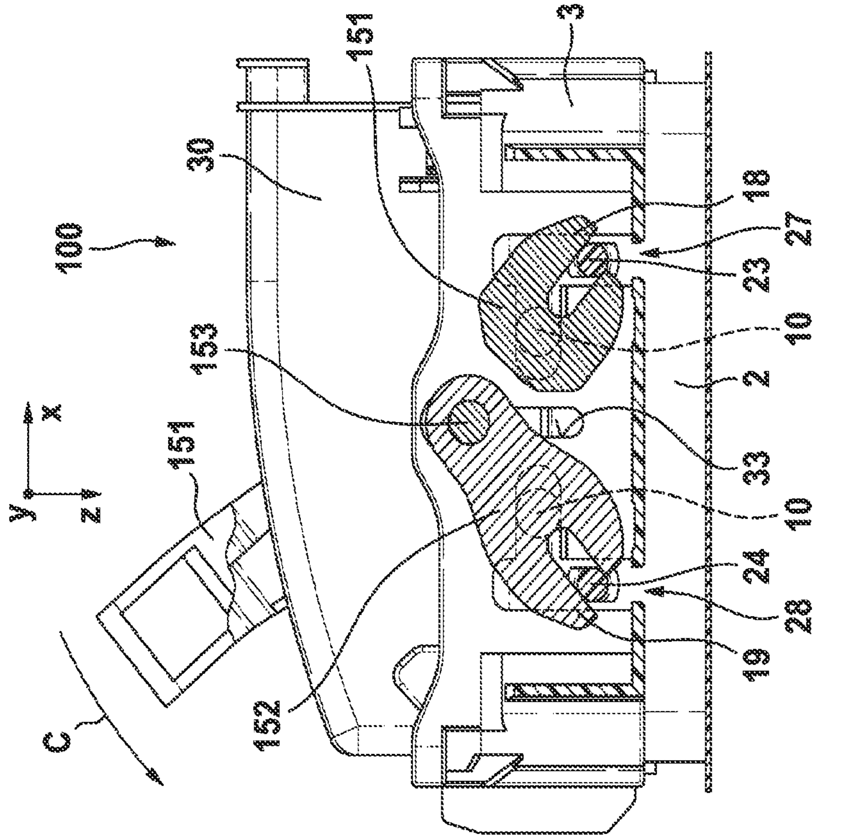
FIGS. 7 to 10 show different sectional views in parallel planes through the plug connector housing or the lever systems of the plug connector, according to an example embodiment of the present invention.
Figure 8:
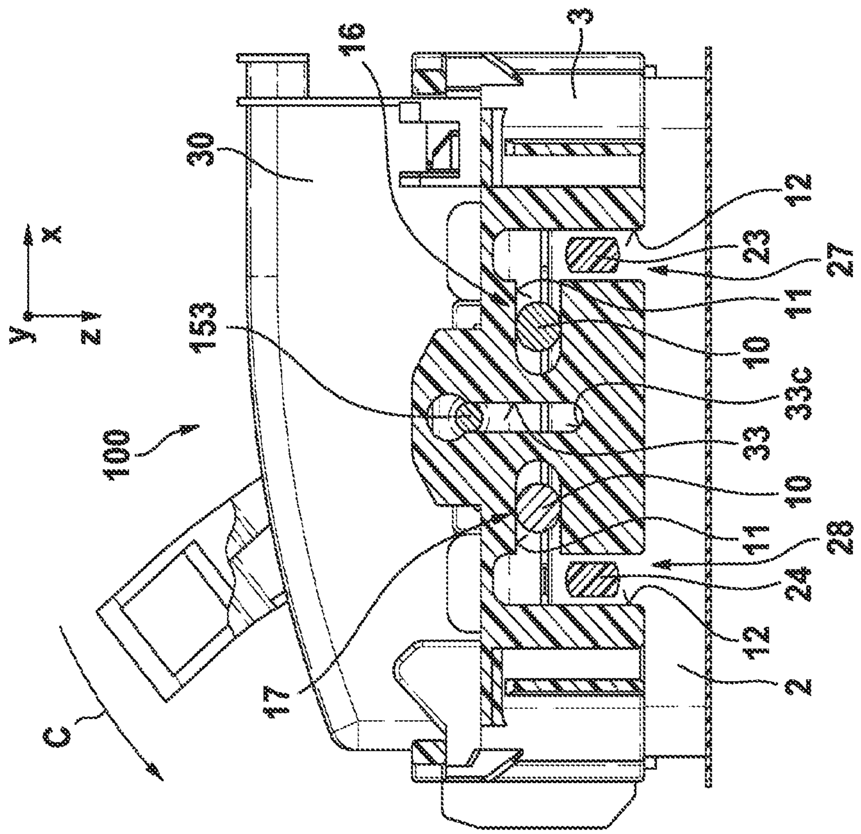

FIGS. 7 and 8 show two different sectional views of plug connector assembly 100 in the not yet closed state. Shown is a state at the beginning of the plug-in operation.

As illustrated in FIG. 7, after plug connector 1 has been placed on mating plug connector 20, engagement elements

8, 9, 18, 19 engage with corresponding counter elements 21, 22, 23, 24. FIG. 7 shows the position between plug connector 1 and mating plug connector 20 in which the lever device was already pivoted slightly (arrow C) and engagement elements 8, 9, 18, 19 engage with counter elements 21, 22, 23, 24. Joint pins 53, 153 are already guided to some extent in guide slots 32, 33 in plug-in direction Z (that is, shifted slightly downward in the figure).

It can be seen quite clearly that pin 10 in groove 11 of third guide system 16 and pin 10 in groove 11 of fourth guide system 17 are still supported quite closely at their ends facing second guide slot 33 in each case. During the further rotating or pivoting of second lever device or second lever system 15 along the direction of rotation (see arrow C), the two pins 10 increasingly shift away from second guide slot 33 in the outward direction in relation to second guide slot 33 (along the X-axis). At the same time, second joint pin 153 is shifted farther downward due to the movement of third and fourth guide system 152, which are connected to pins 10, the movement being forced by guide systems 16, 17.

In the process, counter elements 21, 22, 23, 24 not only engage with engagement elements 8, 9, 18, 19, which pull plug connector 1 onto mating plug connector 20 during the further rotation or pivoting of the lever device. They are also routed into first through fourth counter-element structures 27, 28 (see also FIG. 11) (the first and second counter-element structures are not visible in the figures illustrated here). Third and fourth counter-element structures 27, 28 are developed in the form of grooves or slots 12 in plug connector housing 3 in this instance and extend along plug-in direction Z. This improves a tilt-free, guided, uniform plug-in operation of plug connector 1 and counter plug connector 20. The same also applies to the first and second counter-element structures (not visible here).

In FIG. 7 (and in FIG. 9 as well), pins 10 and grooves 11 152 and also the upper part of second guide slot 33, hidden by arms 151, have been sketched as dashed lines.

Figure 10:
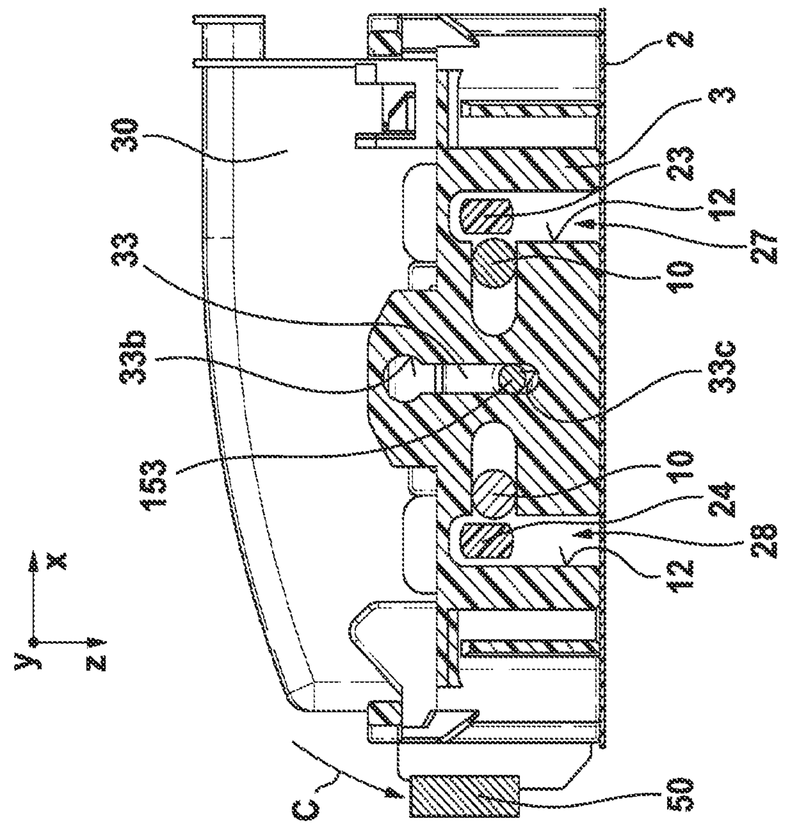
Figure 9:
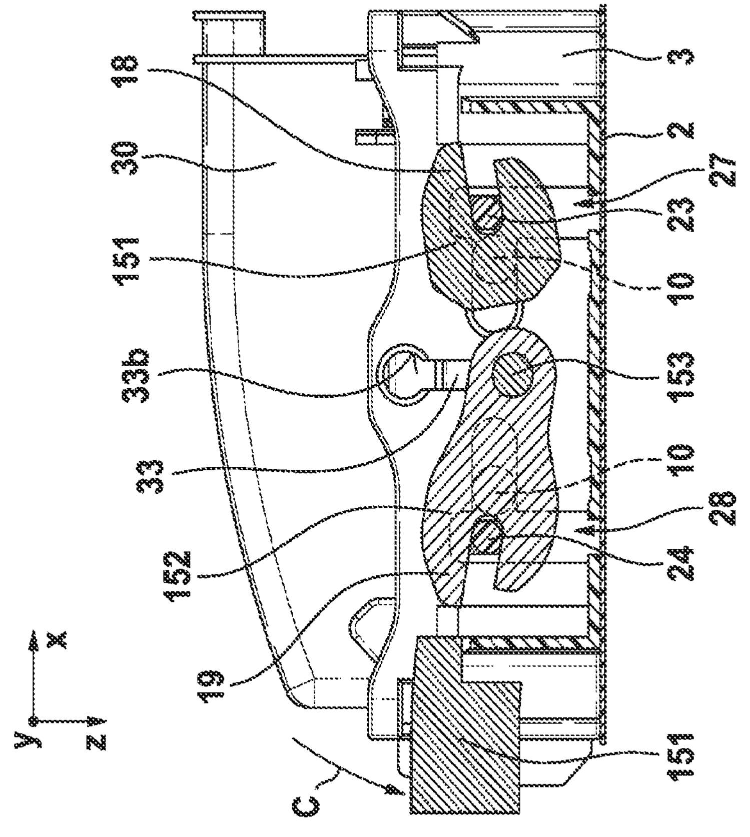

FIGS. 8 and 9 then show an end position of plug connector assembly 100 in which plug connector 1 is fully plugged into mating plug connector 20 and the electrical contacting has been established. As may be gathered from FIG. 9, in particular, engagement elements 8, 9, 18, 19 of first and second lever system 5, 15 are pivoted across a horizontal position so that a secured position of the plugged-in connection between plug connector 1 and mating plug connector 20 is achieved in which an unintentional release of the plug connection is impossible. Engagement elements 8, 9, 18, 19 fully engage with counter elements 21, 22, 23, 24 in this position, which are then situated at the end of the groove or the slot between collet-type jaws or collet jaws of engagement elements 8, 9, 18, 19 (see FIG. 9). FIG. 10 shows the position of pins 10 in grooves 11 according to the position from FIG. 9 of plug connector assembly 100. As may be gathered from FIG. 10, counter elements 21, 22, 23, 24 are positioned adjacent to pins 10.

In addition, it can be seen quite clearly that second joint pin 153 in second guide slot 33 has been shifted to its lower end 33*c*.

The positioning and form of third and fourth guide systems 16, 17 and second guide slot 33 have been selected in such a way that especially a variable operating force reduction and a tilt-free rotation of second lever system 15 are induced. The same analogously applies to first lever system 5 and its elements.

In addition, four vertical slots 12 in which counter elements 21, 22, 23, 24 are movable in the vertical direction, i.e., in plug-in direction Z, are provided in plug connector housing 3. This illustrates once again that plug connector 1 is plugged into mating plug connector 20 only in plug-in direction Z during the plug-in operation, which means that electrical contact elements 40 and electrical counter-contact elements 41 are not exposed to radial forces but merely subjected to forces in plug-in direction Z.

Figure 11:
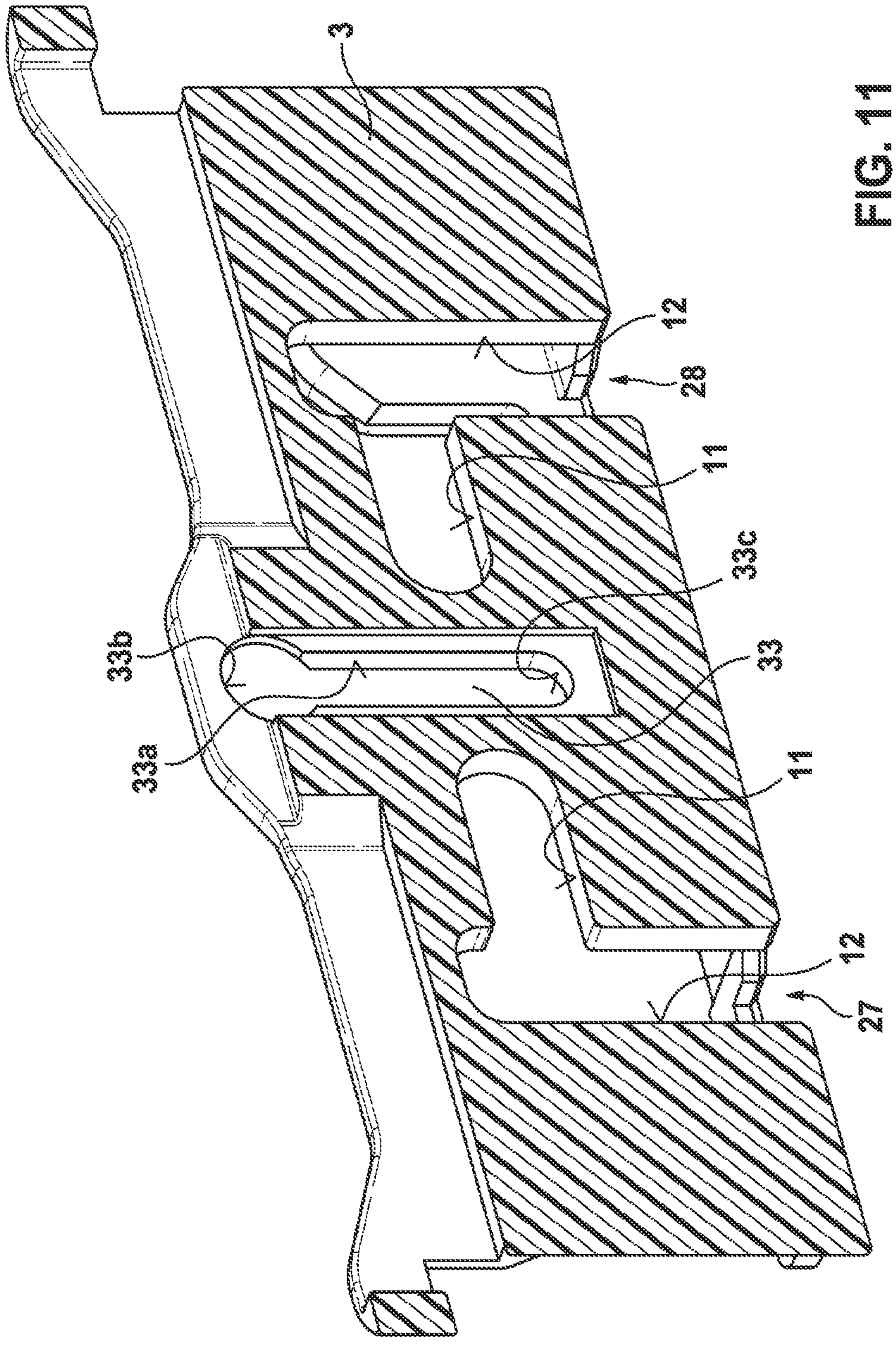
FIG. 11 shows a schematic, part-sectional representation of a side surface of the plug connector housing of FIG. 1.

By way of example, FIG. 11 shows an inner wall of plug housing 3 facing the interior of plug housing 3, in which second guide slot 33 as well as the two grooves 11, which extend horizontally along the X-direction, of third and fourth guide system 16, 17 are developed and also the two grooves of third and fourth counter element structure 27, 28, which extend vertically along plug-in direction Z. The opposite wall having first guide slot 32 and first and second guide system 6, 7 may have an analogous development.

To ensure a reliable guidance during the (joining) plug-in operation, as illustrated in FIG. 11 for one side of plug connector 1 by way of example, a guide surface 33*a* is provided at guide slot 33 along the slot walls of guide slot 33. These guide surfaces 33*a* may be embodied by a step in the wall, for instance.

At an upper end 33*b*, which is a closed end in this case, second guide slot 33 has a diameter enlargement by way of example. Via this upper end 33*b*, second joint pin 153 can be inserted from the outside radially toward the inside. Second joint pin 153 may have a type of cap, which has an enlarged cross-section in comparison with the directly adjoining region of the pin (see also FIGS. 3 and 4). The cap is then able to slide down on guide surfaces 33*a* by its side facing the pin. After shifting away from upper end 33*b* of second guide slot 33, second joint pin 153 can advantageously no longer slip out of the interior space radially toward the outside because of its enlarged diameter. Moreover, the cap and the guide surfaces recessed in the wall have the advantageous result that second joint pin 153 does not project into the interior of plug connector housing 3 or projects only to a slight extent.

In an advantageous manner, the enlarged upper end 33*b* also reduces the risk of damage to second joint pin 153 when the lever device or second lever system 15 is mounted on plug connector housing 3. This is due to the fact that the second joint pin must be mounted on plug connector housing in a rotatable and thus displaceable manner, so that it can easily be slipped through widened upper end 33*b* without causing any damage. FIG. 11 once again also shows in detail the positioning of vertical slots 12 relative to grooves 11, at a right angle in this instance.

It should be pointed out once again that only one side of plug connector 1 has been shown and described in FIGS. 7 to 11, but the opposite side on which first lever system 5 is situated is developed in the same way as the side shown in FIGS. 7 to 11.

As may furthermore be gathered from FIGS. 8, 10 and 11, a length of guide slots 32, 33 in the vertical direction is such that a lower end 33*c* of second guide slot 33 lies below grooves 11 which are part of third and fourth guide systems 16, 17 here by way of example. As a result, the lever device having first and second lever system 5, 15 is able to be pressed downward beyond a horizontal plane, which means that a safety position of the lever device in the plugged-in state of plug connector 1 in mating plug connector 20 is possible. This state is shown in FIGS. 9 and 10. The end position may advantageously be further secured, e.g., by detent openings or similar mechanisms.

The function of plug connector assembly 100 according to the present invention having plug connector 1 of the present invention will be schematically described once again with the aid of FIGS. 12 to 16.

Figure 12:
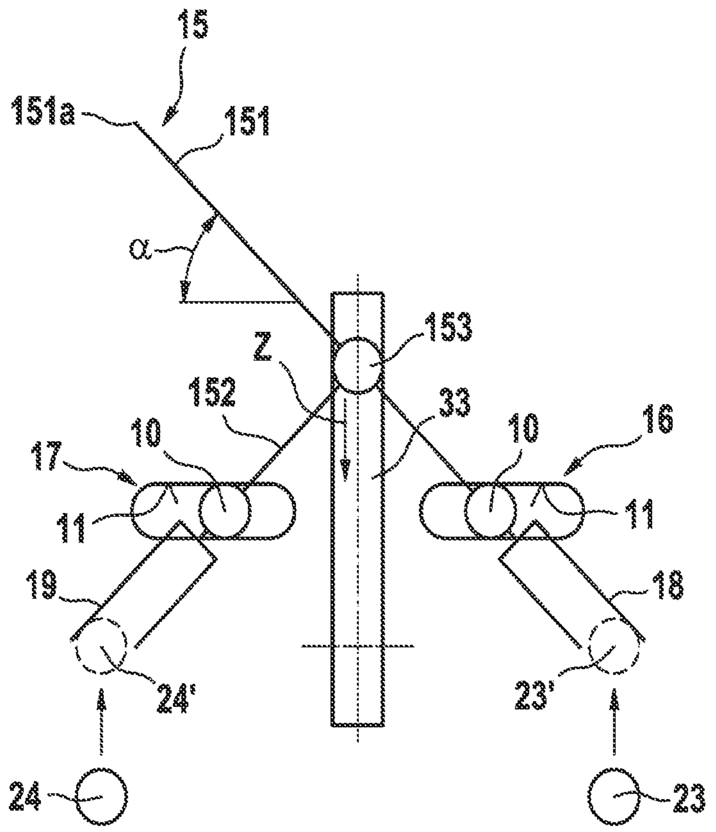
FIGS. 12 to 14 show schematic representations of the movement sequence of a lever system during the plug-in operation of the plug connector and mating plug connector, in different lever positions, according to an example embodiment of the present invention.
Figure 13:
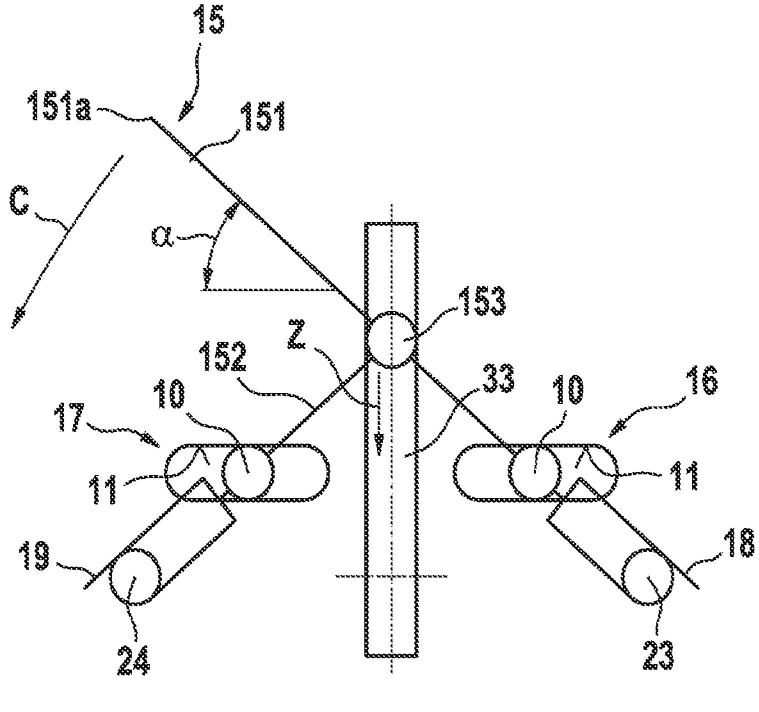

FIG. 12 schematically shows the initial position prior to the start of the plug-in operation. Plug connector 1 is placed over mating plug connector 20 in such a way that the four engagement elements 8, 9, 18, 19 lie above the four pin-type counter elements 21, 22, 23, 24. Next, plug connector 1 is moved in plug-in direction Z so that engagement elements 8, 9, 18, 19 rest against counter elements 21, 22, 23, 24, as schematically sketched in FIG. 12 by dashed counter elements 23', 24'. Next, first and second lever system 5, 15 are rotated (counterclockwise in this case), as indicated by arrow C in FIG. 13. On the one hand, this changes a relative position between pins 10 relative to grooves 11 (pins 10 travel from the center in an outward direction in each case), and engagement elements 8, 9, 18, 19 come to engage with counter elements 21, 22, 23, 24 on the other hand. First and second joint pin 53, 153 is moved vertically downward in plug-in direction Z in first and second guide slot 32, 33 (along plug-in direction Z). FIG. 13 shows a state where an angle α between first or third arm 151 and a horizontal plane is slightly reduced in size by approximately 10° starting from the initial state in FIG. 12.

Figure 14:
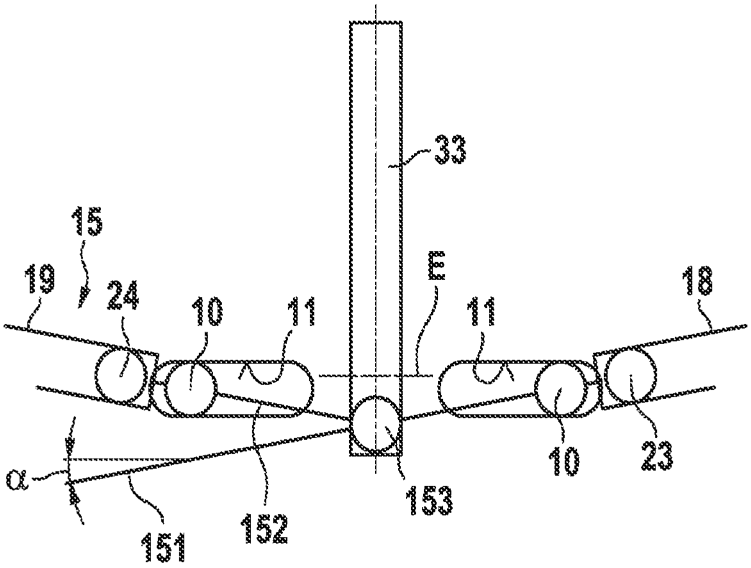

FIG. 14 then shows the end position that is assumed by the plugged-in plug connector 1 in mating plug connector 20. In the process, the joints or first and second joint pin 53, 153 were moved along plug-in direction Z across a horizontal plane E in which grooves 11 are situated, so that the plug connection is secured. First and second joint pins 53, 153 are therefore situated below horizontal plane E. The lever device thus has been transferred to an overridden state.

FIGS. 15 and 16 once again illustrate the connection process between plug connector 1 and mating plug connector 20.

Figure 15:
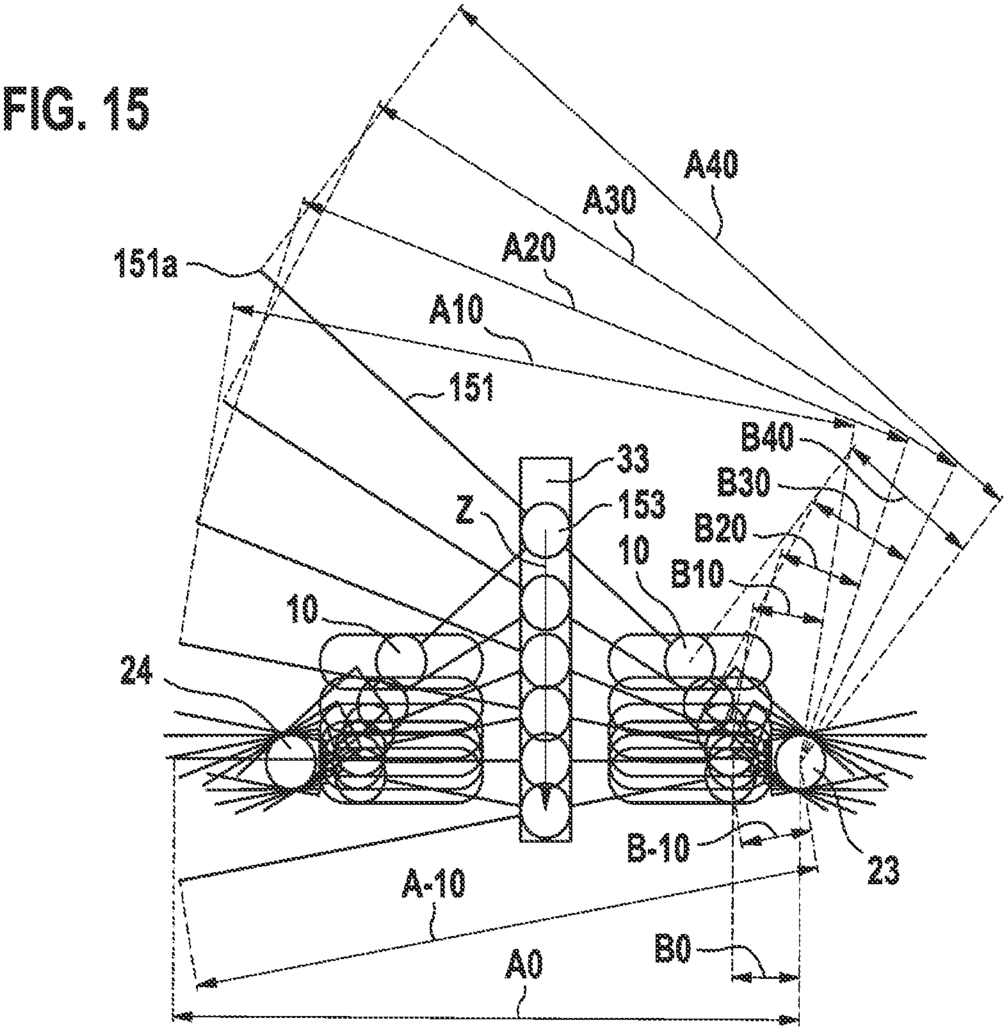
FIG. 15 shows a schematic representation of the movement sequence of the lever system of FIGS. 12 to 14 in a single representation, which illustrates different angular positions of the lever system.

FIG. 15 shows—in 10° steps starting from an angle α equal to 40°—first distances A between a free end 151*a* of third arm 153 and a center point of third counter element 23, which are identified in FIG. 15 according to the 10° steps by A40, A30, A20, A10, A0 and A−10 (A minus 10°).

In addition, second distances B between a center of pin 10 and the center of third counter element 23 are shown in FIG. 15, likewise in 10° steps starting from B40, across B30, B20, B10, B0 and B−10 (B minus 10°). The position A−10 and B−10 represents a secured, plugged-in position corresponding to FIG. 14 between plug connector 1 and mating plug connector 20. In addition, FIG. 15 also illustrates the position of second joint pin 153 in second guide slot 33 as a function of the rotation of the lever device in 10° steps.

Figure 16:
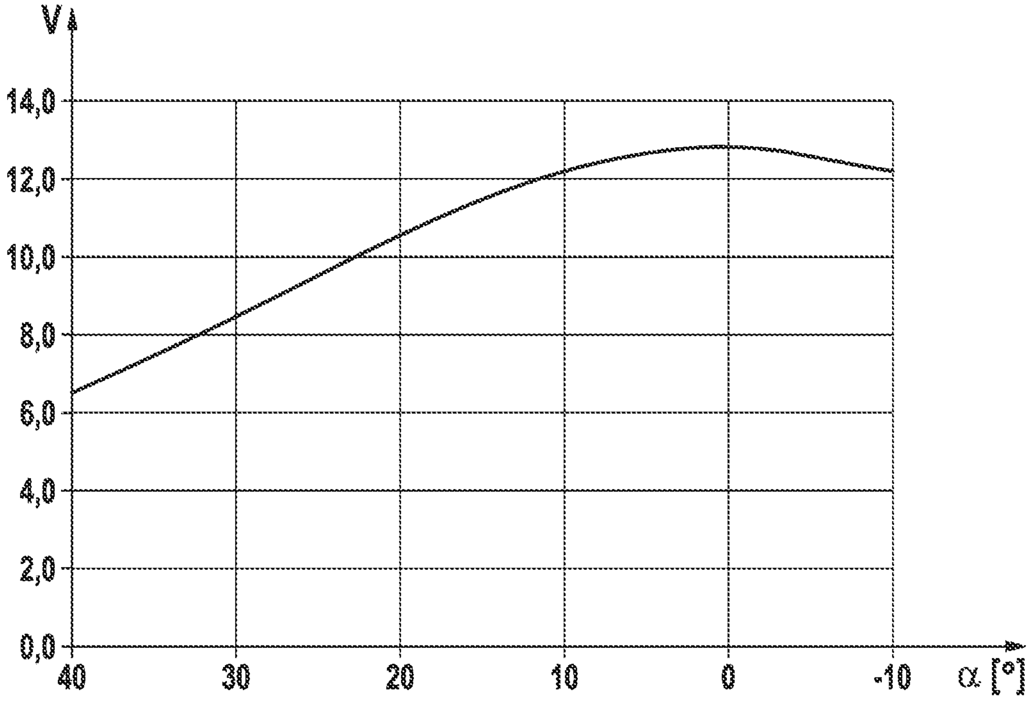
FIG. 16 shows a schematic diagram and a table, which shows a relationship V between a first length A from a first lever end to a counter element on the mating plug connector and a second length B from a guide element of the guide system to the counter element during a plug-in operation, according to an example embodiment of the present invention.

The table of FIG. 16 shows a relationship V=A/B made up of first distance A and second distance B according to angle α between third arm 151 and a horizontal plane in each case. This relationship corresponds to the force translation by lever devices 5, 15. A relationship of V=2, for instance, means that the operating force (without friction losses) relative to the plug-in force is reduced by half (the operating travel proportionally increases to twice the plug-in travel).

Shown above the table in FIG. 16 is a diagram of the relationship V=A/B across angle α in degrees. It can be seen that the greatest relationship for this exemplary embodiment exists in the range of α=0°. This means that when lever systems 5, 15 are aligned parallel to horizontal plane E, the force translation becomes greatest at an angle α=0°. In the illustrated exemplary embodiment, the plug-in operation is completely concluded at this angle so that electrical contact elements 40 fully contact electrical counter-contact elements 41. The plug-in operation then continues up to an angle α=−10° in order to secure the plug connection.

It may furthermore be gathered from the diagram of FIG. 16 that because of the changing relationship V=A/B across the decreasing angle, a greatest leverage exists in the range of angle α of ±0°. In other words, the leverage steadily increases from α=40° to α=0° when plug connector 1 is plugged into mating plug connector 20 and lever systems 5, 15 are operated. This is advantageous especially since a required plug-in force during the plug-in operation becomes increasingly greater here with an increasing travel in plug-in direction Z (here, for instance, the plug-in force may be made up of contact forces for contacting the contact elements 40 with counter-contact elements 41; a force for overcoming a rising internal pressure in a sealed plug connection given a non-ventilated plug-connector housing; etc.). Thus, plug connector 1 according to the present invention can assist in the plug-in operation and the force application by a user in an optimal manner by continually modifying the leverage across the plug-in travel. The operating force of the installer is thereby able to be kept below a defined threshold, even at an increasing plug-in force, without an excessive increase in the operating travel. As a result, the support of the user of plug connector assembly 100 is at its greatest whenever the force required to plug connector 1 into mating plug connector 20 is also at its highest. This is a great advantage especially in the case of plug connector assemblies provided with a multitude of electrical contacts or contact elements.

With an increasing translation, the operating travel rises, as illustrated above. Because of the existing variable, non-linear or non-constant leverage, a dual advantage is achieved using simple means.

This is because the variable translation at all points of the plug-in travel ensures that the operating force remains below a critical threshold (e.g., 75 N or 50 N or 40 N). However, in sections of the plug-in travel in which the plug-in force is not so high, the operating travel is able to be shortened by a lower leverage in comparison with the operating travel at the highest leverage. Depending on the plug connector assembly, this variable leverage, which advantageously manages completely without toothed wheels, gear racks or slider elements, is able to be adapted to the desired marginal conditions with regard to the operating force and operating travel by a suitable design of the guide systems and the guide slots and their mutual relative positioning at a low expenditure.

Figure 17:
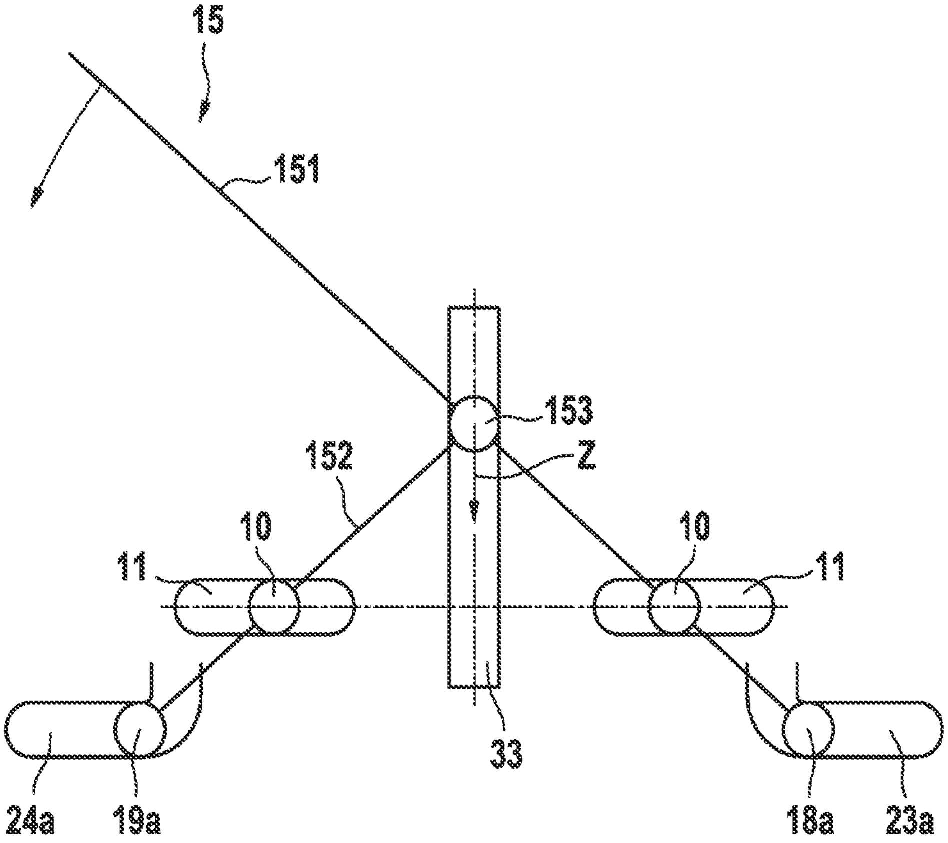
FIG. 17 shows a schematic representation of a plug connector assembly according to a second exemplary embodiment of the present invention.

FIG. 17 shows a plug connector 1 and a plug connector assembly 100 according to a second preferred exemplary embodiment of the present invention, where identical or functional parts are denoted by the same reference numerals. In contrast to the first exemplary embodiment, the positioning of the engagement elements on plug connector 1 and the geometrically corresponding counter elements on mating plug connector 20 has been reversed in the second exemplary embodiment. As illustrated in FIG. 17, cylindrical or conical pins 18*a*, 19*a*, for example, are provided as engagement elements on third and fourth arms 151, 152, which engage with collet-type or slot-type or groove-type counter elements 23*a*, 24*a* having a geometrically corresponding development on mating plug connector 20 or on mating plug connector housing 2. FIG. 17 schematically shows only the illustration of second lever system 15. However, first lever system 5 of the second exemplary embodiment has the same development as second lever system 15. In all other respects, this exemplary embodiment corresponds to the previous exemplary embodiment so that reference can be made to the description provided there.

Figure 18:
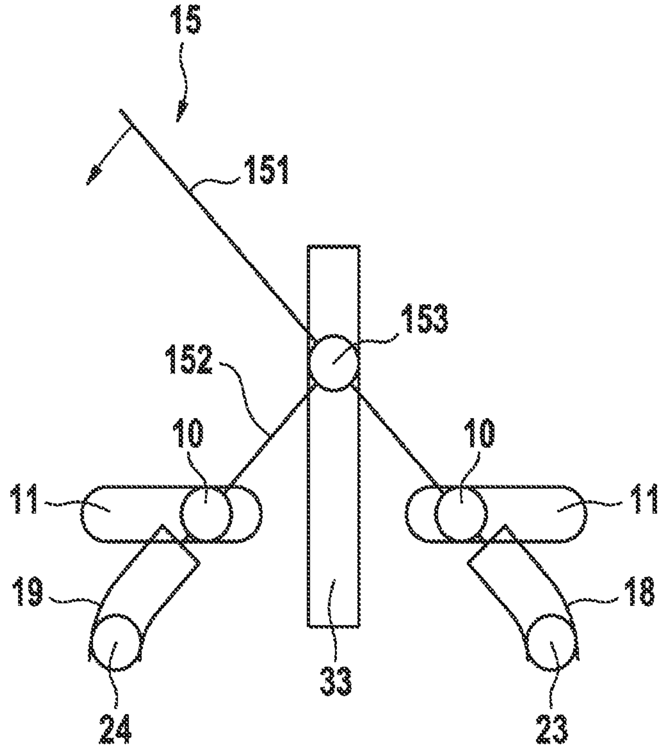
FIG. 18 shows a schematic representation of a plug connector assembly according to a third exemplary embodiment of the present invention.
Figure 19:
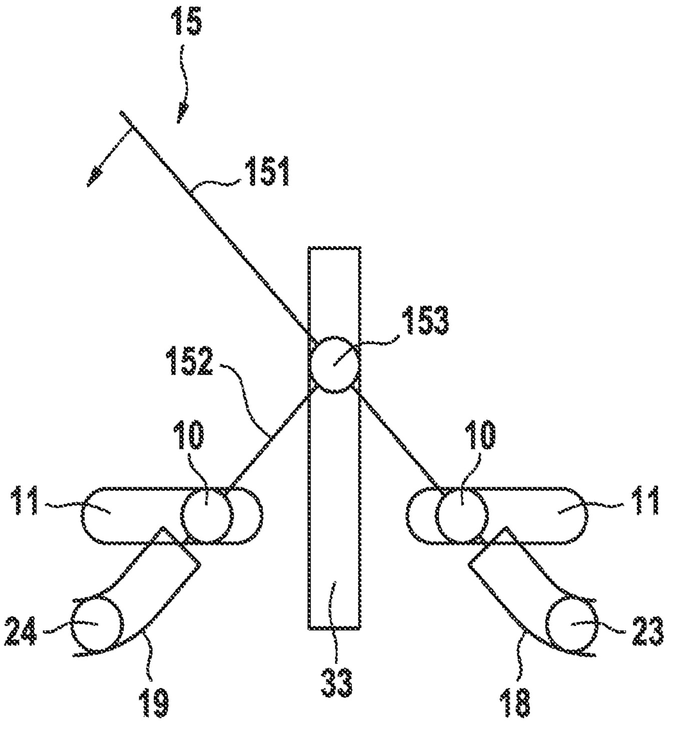
FIG. 19 a schematic representation of a plug connector assembly according to a fourth exemplary embodiment of the present invention.

FIGS. 18 and 19 show a third and fourth exemplary embodiment of the present invention, in which identical or functionally identical parts are once again denoted by the same reference numerals. In the third exemplary embodiment of FIG. 18, the third and fourth engagement elements are developed with arched free ends, which are bent inward in the direction of second joint pin 153 or toward second guide slot 33.

In the fourth exemplary embodiment in FIG. 19, third and fourth engagement elements 18, 19 are also developed with arched ends, but these arched ends are bent outward at their free end, that is, away from second guide slot 33.

Additional alternative exemplary embodiments are schematically illustrated in FIGS. 20 to 23.

Figure 20:
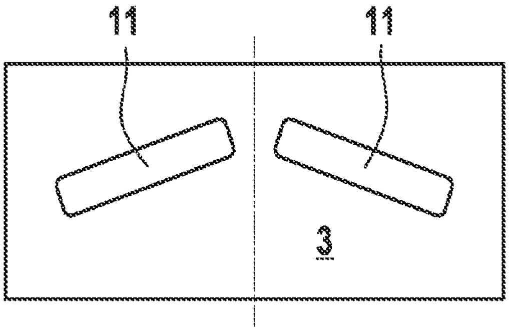
FIGS. 20 to 23 show schematic representations of further alternatives of the plug connector assembly, according to example embodiments of the present invention.
Figure 21:
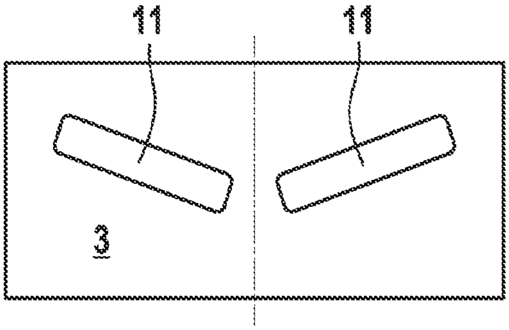
Figure 22:
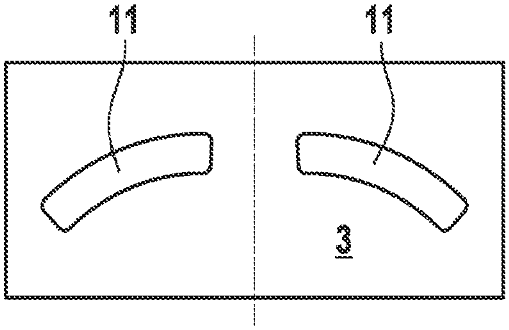
Figure 23:
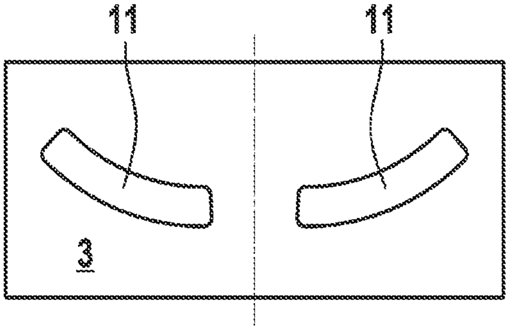

In FIGS. 20 and 21, grooves 11 in plug connector housing 3 are no longer developed horizontally by way of example but have a rectilinear development at a predefined angle, preferably 15° with respect to a horizontal plane extending along the X-direction. In FIGS. 22 and 23, grooves 11 have an arched development, once in a concave shape and once in a convex shape, relative to the horizontal plane.

Because of this angled system of rectilinear grooves (FIGS. 20 and 21) or the arched system of grooves 11 (FIGS. 22 and 23), a leverage is able to be influenced in a selective manner during the plug-in travel. For instance, this is advantageous if electrical contact elements 40 have electrical blades or contact lamellae that must be displaced by electrical counter-contact elements 41 during the plug-in operation. This may lead to a marked increase in the applied force for the plug-in operation (feed-in peak), which can be adapted by an appropriate geometrical development of grooves 11 such that the highest leverage (and thus the lowest relative operating force) is present when the greatest insertion or plug-in force is required to carry out the plug-in operation.

Figure 24:
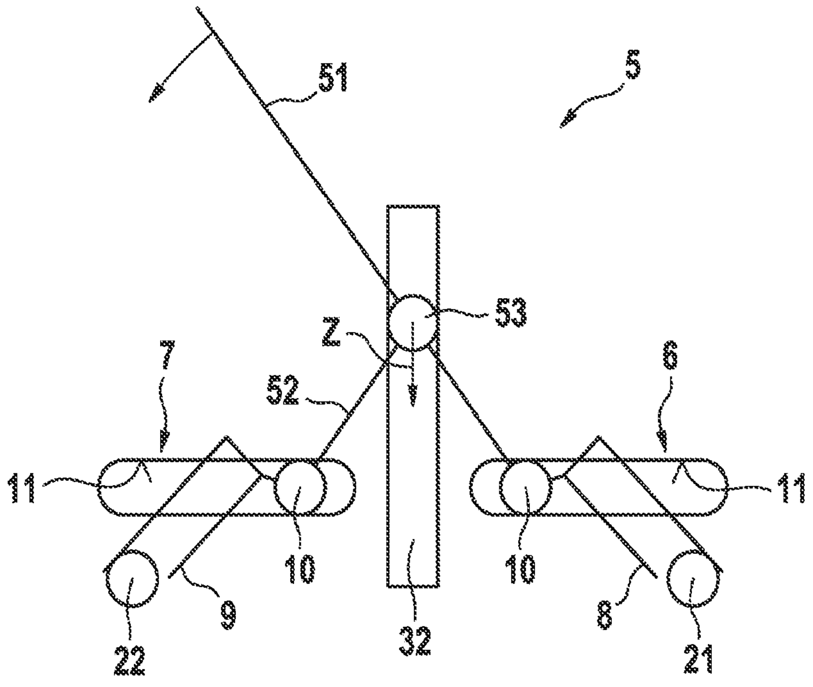
FIG. 24 shows a schematic representation of a plug connector assembly according to a fifth exemplary embodiment of the present invention.

FIG. 24 shows a plug connector 1 of a plug connector assembly 100 according to a fifth exemplary embodiment of the present invention. Identical or functionally identical parts have once again been provided with the same reference numerals. The fifth exemplary embodiment essentially corresponds to the first exemplary embodiment, but in contrast to the first exemplary embodiment, first joint pin 53, pin 10 and first engagement element 8 no longer lie in a common plane. In other words, pin 10 may be placed eccentrically to the slot of first engagement element 8, for example. As may be gathered from FIG. 24, a connection between pin 10 and first engagement element 8 and (further) pin 10 and second engagement element 9 in particular has an angled or eccentric development. This makes it possible to further reduce the force required to execute the plug-in operation. FIG. 24 shows the state of the plug-in operation in which plug connector 1 has just been placed on mating plug connector 20 so that engagement elements 8, 9 contact the corresponding counter elements 21, 22.

FIG. 24 once again shows only one side of plug connector 1 on first lever system 5. The second side of plug connector 1 having second lever system 15 has an identical development and no further detailed description will be provided.

In connection with the described exemplary embodiments, it should be noted that all kinds of different combinations are naturally possible. More specifically, grooves 11 shown in FIGS. 20, 21, 22 and 23 can be used in all described exemplary embodiments.

It is also possible that the engagement elements shown in FIGS. 18, 19 and 24 can be used in all described exemplary embodiments.

It should furthermore be noted that it is also possible that grooves 11 are not provided in plug connector housing 3 but on lever systems 5, 15, and pins 10 are then correspondingly provided on plug connector housing 3. In other words, guide systems 6, 7, 16, 17 and engagement elements 8, 9, 18, 19 on lever systems 5, 15 and on plug connector housing 3 may also be provided on the respective other component.

Moreover, it is understood that all exemplary embodiments may also be developed with only a single lever system. The depiction of second lever device 15 does not mean that two lever systems 5, 15 have to be provided.

It is furthermore understood that the guide systems or guide receptacles, which are developed as grooves here by way of example and disposed on the same longitudinal side of plug connector housing 3, do not have to be positioned at the same height (i.e., viewed along the Z-axis). For instance, this may be useful if counter elements 21, 22 or 23, 24 situated on the same longitudinal side of plug connector housing 3 are disposed at different heights (with regard to the Z-axis). In the same way, first and second guide slot 32, 33 may also extend at a (slight) tilt relative to plug-in direction Z, e.g., tilted by up to 30°, preferably by up to 15°, and especially preferably by up to 10°.

In comparison with a plug connector having a lever system that includes a link structure for a variable reduction of the plug-in force, the provided plug connector has the advantage that the frictional forces are markedly reduced during the operation.

In comparison with a plug connector provided with a slider element to reduce the operating force, the provided plug connector offers the advantage that the frictional forces in the operation are markedly reduced. In addition, the provided solution has a self-centering effect during the plug-in and/or the release operation, so that the risk of tilting or jamming when establishing the plug-in connection or releasing it is reduced.

In comparison with a plug connector having a lever system to reduce the operating force, which is provided by the meshing of toothed gears, the provided plug connector has the advantage that a variable translation ratio is able to be adjusted and adapted to the individual application purpose in a low-friction manner using simple means.

What is claimed is:

1. A plug connector to be plugged along a plug-in direction into a mating plug connector having a mating plug connector housing, the plug connector comprising:

- a plug connector housing;
- a plurality of electrical contact elements, which are situated in the plug connector housing; and
- a first lever system configured to reduce an operating force when the plug connector is plugged into and/or released from the mating plug connector, the first lever system being rotatably supported on the plug connector housing, and including:
  - a first arm and a second arm, the second arm being pivotably disposed on the first arm using a first joint pin, the first joint pin being movable in the plug connector housing in a first guide slot, wherein the first guide slot is situated in a wall of the plug connector housing, which essentially extends along the plug-in direction,
  - a first guide system between the first arm and the plug connector housing, the first guide system having a first guide element and a first guide receptacle to accommodate the first guide element, a second guide system between the second arm and the plug connector housing, the second guide system including a second guide element and a second guide receptacle to accommodate the second guide element, a first engagement element, which is situated on the first arm and is configured to engage with a first counter element on the mating plug connector housing, and a second engagement element, which is situated on the second arm and is configured to engage with a second counter element on the mating plug connector housing.

2. The plug connector as recited in claim 1, further comprising:

a second lever system, including:

a third arm and a fourth arm, the fourth arm being disposed on the third arm using a second joint pin, the second joint pin being movably situated in the plug connector housing in a second guide slot, which essentially extends along the plug-in direction, a third guide system between the third arm and the plug connector housing, the third guide system including a third guide element and a third guide receptacle to accommodate the third guide element, a fourth guide system between the fourth arm and the plug connector housing, the fourth guide system having a fourth guide element and a fourth guide receptacle to accommodate the fourth guide element, a third engagement element, which is situated on the third arm and is configured to engage with a third counter element on the mating plug connector housing, and a fourth engagement element, which is situated on the fourth arm and is configured to engage with a fourth counter element on the mating plug connector housing.

3. The plug connector as recited in claim 2, wherein each of the first and second guide elements is a respective pin, and each of the first and second guide receptacles is a respective groove, and a position of each pin in the respective groove is variable.

4. The plug connector as recited in claim 3, wherein each respective pin is situated on an arm, and each respective groove is situated in the plug connector housing.

5. The plug connector as recited in claim 3, wherein each respective groove essentially extends transversely to the plug-in direction, at a right angle.

6. The plug connector as recited in claim 3, wherein the first, second, third, and fourth guide systems have rectilinear grooves or the first, second, third, and fourth guide systems have arched grooves.

7. The plug connector as recited in claim 3, wherein, when viewed along the plug-in direction, each of the first and second guide slots has a lower end which lies below the grooves and/or the first and second guide slots, when viewed along the plug-in direction, have an upper end which lies above the grooves.

8. The plug connector as recited in claim 2, wherein the first lever system and the second lever system are connected to each other using a connection element.

9. The plug connector as recited in claim 2, wherein each of the first and second guide slots has a rectilinear disposition.

10. The plug connector as recited in claim 9, wherein each of the first and second guide slots is situated along the plug-in direction.

11. The plug connector as recited in claim 2, wherein the first joint pin is situated on the first arm and the second joint pin is situated on the third arm.

12. A plug connector assembly, comprising:

a plug connector to be plugged along a plug-in direction into a mating plug connector having a mating plug connector housing, the plug connector including:

a plug connector housing;

a plurality of electrical contact elements, which are situated in the plug connector housing; and a first lever system configured to reduce an operating force when the plug connector is plugged into and/or released from the mating plug connector, the first lever system being rotatably supported on the plug connector housing, and including:

a first arm and a second arm, the second arm being pivotably disposed on the first arm using a first joint pin, the first joint pin being movable in the plug connector housing in a first guide slot, wherein the first guide slot is situated in a wall of the plug connector housing, which essentially extends along the plug-in direction, a first guide system between the first arm and the plug connector housing, the first guide system having a first guide element and a first guide receptacle to accommodate the first guide element, a second guide system between the second arm and the plug connector housing, the second guide system including a second guide element and a second guide receptacle to accommodate the second guide element, a first engagement element, which is situated on the first arm and is configured to engage with a first counter element on the mating plug connector housing, and a second engagement element, which is situated on the second arm and is configured to engage with a second counter element on the mating plug connector housing; and the mating plug connector, the mating plug connector having the mating plug connector housing having counter elements including the first and second counter elements.

13. The plug connector assembly as recited in claim 12, wherein the mating plug connector has a plurality of electrical counter-contact elements, which are situated in the mating plug connector housing and are configured to contact electrical contact elements of the plug connector in a plugged-in state of the plug connector and the mating plug connector.

14. The plug connector assembly as recited in claim 12, wherein the first and second counter elements on the mating plug connector housing are coupled with complementary counter-element structures on the plug connector housing when plugged together, and the first and second counter elements shift relative to the plug connector housing along the plug-in direction during the plug-in operation.

* * * * *